July 21, 1970   G. SPEGGIORIN   3,521,449
VARIABLE HYDRAULIC GEAR

Filed March 27, 1968   3 Sheets-Sheet 1

INVENTOR.
Giuseppe Speggiorin

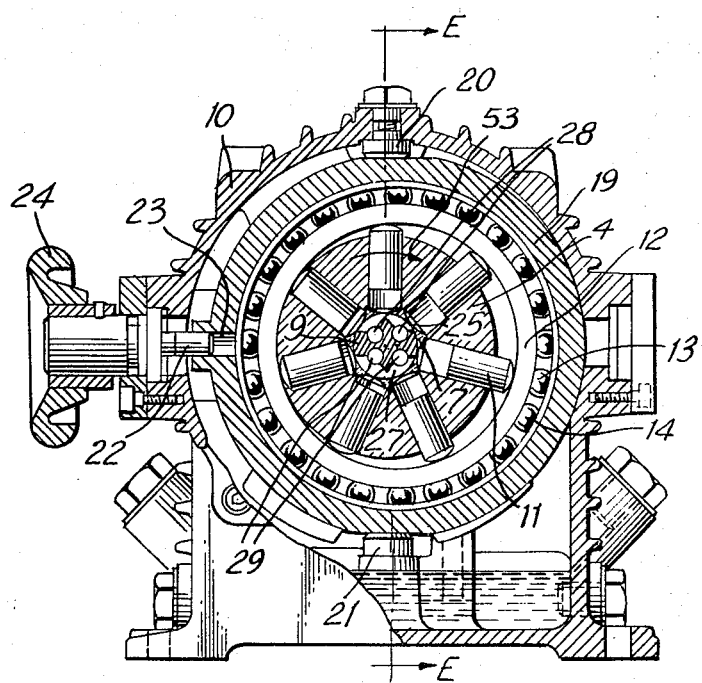

July 21, 1970   G. SPEGGIORIN   3,521,449

VARIABLE HYDRAULIC GEAR

Filed March 27, 1968   3 Sheets-Sheet 3

INVENTOR.
Giuseppe Speggiorin

United States Patent Office 3,521,449
Patented July 21, 1970

3,521,449
VARIABLE HYDRAULIC GEAR
Giuseppe Speggiorin, Tavernelle di Altavilla, Italy, assignor to Var-Spe s.a.s. di Speggiorin G. & C. (Societa in accomandita semplice), Tavernelle di Altavilla, Italy, a corporation of Italy
Filed Mar. 27, 1968, Ser. No. 721,547
Claims priority, application Italy, Apr. 1, 1967, 61,538/67
Int. Cl. F16d 3/14, 31/02; F04b 1/10
U.S. Cl. 60—53                             6 Claims

ABSTRACT OF THE DISCLOSURE

A hydraulic gear device with variable ratio has a main pump, an auxiliary or booster pump and a motor. The rotors of the main pump and the motor have radial chambers containing slidable pistons. These chambers are interconnected by conduits extending through a fixed central shaft of the device. The pistons of both the main pump and the motor are adapted to engage separate rotatable rings. Means are provided to adjust the eccentricity of at least one of these rings relatively to the central shaft. The auxiliary pump is provided with blades and is driven from the main pump. The auxiliary pump provides initial liquid pressure for the main pump and the motor and is adapted to discharge excess liquid to a sump.

---

The present invention has the object of providing a variable hydraulic gear comprising a pump and motor with radial pistons, in which the transmission ratio varies as the eccentricity of one or both rotors with respect to the chassis, and in which the circulating liquid, such as mineral oil, passes from the pump to the motor and back again through connecting conduits disposed inside a central fixed shaft of the assembly. The driving shaft of the pump is connected to a booster pump which is included in the hydraulic circuit, the oil therein being conducted to the motor during starting.

The casing of the gear has an oil sump which need not be of great capacity, which permits the realization of a gear assembly of modest size the casing being provided externally with cooling fins and reinforcement webs.

The rotor of the pump is connected to the driving shaft, while the rotor of the motor is connected to a driven shaft. The speed of rotation of the driven shaft may be varied within wide limits with respect to the driving shaft; it may be greater, equal to or less than the speed of the driving shaft, notably either in the same or the opposite direction of rotation, by means of the variation of the eccentricity of the path of the pump and/or of the motor pistons.

Other characteristics of the gear are that the output channel from the booster pump has a blow-off valve, and may also have non-return valves between the motor and the pump, which valves may be of the ball type, and lodged inside the central fixed shaft.

Again, there is preferably a safety blow-off valve in the main oil channel which opens when the oil pressure exceeds a predetermined limit, to allow the discharge of oil into the sump.

A further characteristic of the invention concerns the couplings which connect respectively the driving and driven shafts with the rotors of the pump and the motor, in order to avoid shock and mechanical disturbance being transmitted directly to the rotors.

The variation of the eccentricity of the pistons of one or both rotors is brought about by means of a movement of certain bearings, against the internal shelves of which the radial pistons run.

A supply of oil from the booster pump may be used to control servo-mechanisms external to the gear.

The invention will now be further described with reference to the accompanying drawings, in which:

FIG. 2 shows a transverse section along the line A—A of FIG. 1.

FIG. 3 shows a transverse section, along the line B—B of FIG. 1.

Figure 1:
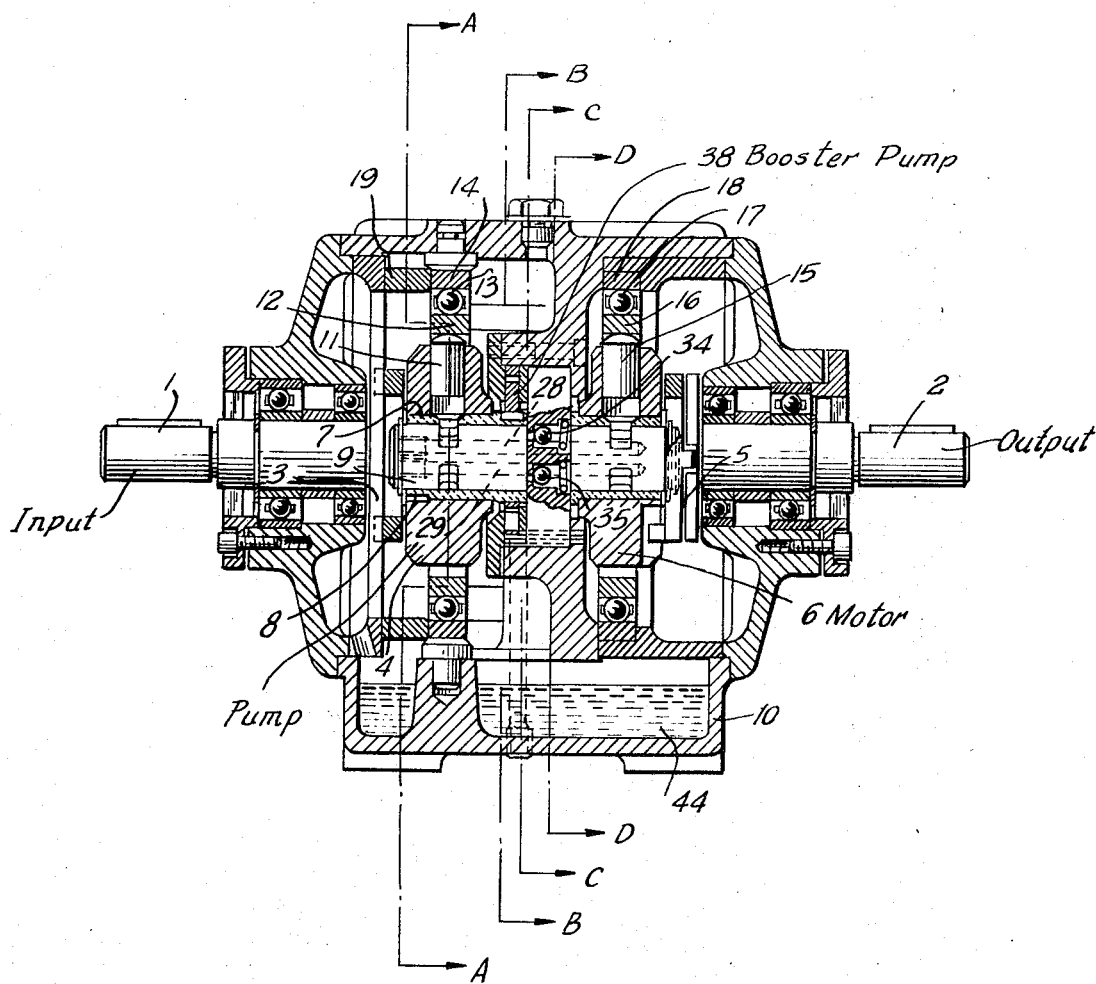
FIG. 1 represents a section along the longitudinal access of an assembly.

The controller, according to the invention, comprises a driving shaft 1 (FIG. 1) and a driven shaft 2.

A driving shaft 1 is connected by means of a cushioned dog clutch 3 to the rotor of the pump 4, while a driven shaft 2 is connected by means of another cushioned dog clutch 5 to the rotor of the hydro-motor 6.

The rotor of the pump 4 is fixed to a bush 7, by means of a key 8. The bush 7 turns about a central shaft 9 fixed to the chassis 10 of the controller.

The rotor of the pump 4 comprises cylindrical, radial cavities, in which pistons 11 slide; the pistons are moved outwardly by the pressure of the liquid, and abut against an internal shell 12 of a rolling bearing 13, the external shell 14 of which is fixed to the chassis 10, although being able to be moved in a transverse direction to the latter.

Similarly, the rotors of the motor 6 comprise cylindrical, radial cavities, in which move the pistons 15; the pistons are moved outwardly by the pressure of the liquid and abut against an internal shell 16 of a rolling bearing 17, the external shell 18 of which is fixed, to the chassis 10.

One or both of the rolling bearings 13 and 17 may have variable eccentricity with respect to the shaft 9.

In the embodiment illustrated in FIG. 2, the external shell 14 of the bearing 13 is fixed to a movable ring 19, provided with diametrically opposed plane surfaces, which slide in the guides 20 and 21, and moves in a transverse direction to the axis of the controller, in a horizontal plane.

Such movement is controlled by the screw 22 which engages in a slot 23 made in the ring 19, its rotation being controlled by hand by means of the knob 24.

A variation of the eccentricity of the bearing 13 brings about a corresponding variation of the maximum distance moved by the pistons 11 in their respective cylindrical cavities and consequently a variation of the stroke of each piston and output of the pump.

In the embodiment illustrated, the motor 6 has constant eccentricity of piston path, but it is evident that this eccentricity could also be variable, by means similar to those provided in the pump.

Each radial cylindrical cavity of the pump or the motor is arranged to correspond with an aperture 25 (FIG. 2) in the bush 7, so as to be able to communicate with two chambers 26 and 27, found in the central shaft 9, and thus in communication, respectively by means of the pair of conduits 28 and 29, with corresponding chambers disposed within the motor 6.

Figure 4:
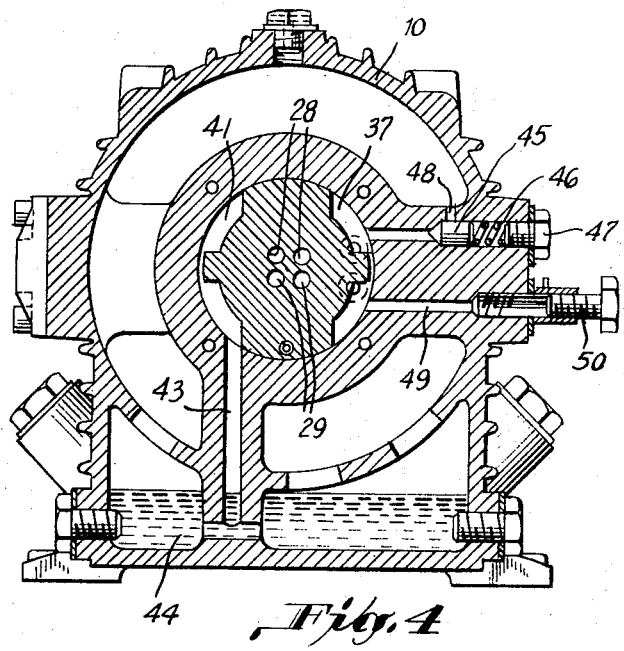
FIG. 4 shows a transverse section along the line C—C of FIG. 1.
Figure 5:
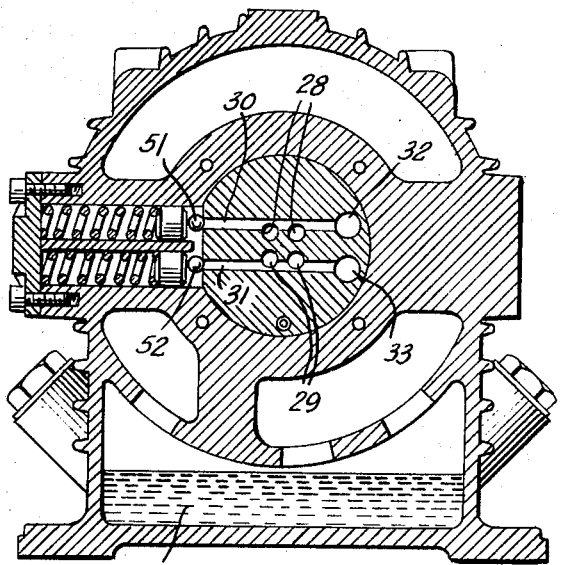
FIG. 5 shows a transverse section along the line D—D of FIG. 1.

The longitudinal conduits 28 and 29 are connected, respectively by means of transverse conduits 30 and 31 (FIG. 5) with chambers 32 and 33, and subsequently in communication, respectively by means of the valves 34 and 35 (FIG. 1) with the chamber 36 (FIG. 4) of the pump rotor 38 (FIG. 3).

The valves 34 and 35, normally held closed by springs, act alternately, depending upon whether the motor rotates in the same direction or in the opposite direction with respect to the pump, this direction of rotation corresponding to a motor eccentricity which is the same as or different from that of the pump. In fact the oil flow to the rotor 38, is determined by the return conduit which is provided for the liquid between the motor 6 and the booster pump 38.

This latter has a rotor provided with radial cavities in which move the blades 39, the rotor being connected by means of a key 40 to the bush 7 integral with the rotor of the pump 4.

The intake chamber 41 (FIG. 4) of the booster pump 38 is connected by means of a suction conduit 43 to a sump 44 disposed in the base of the chassis 10, which sump functions as a reservoir for the oil of the device.

A valve 45, held closed by a spring 46 restrained by a screw 47, allows overflow through a conduit 48, into the sump 44, of the excess capacity of the booster pump 38.

A conduit 49, closed by a screw 50, communicates with the pumping chamber 37 of the booster pump; removal of the screw allows a manometer to be connected to measure the pressure of the liquid in the said pumping chamber 37, and also making it possible to withdraw liquid under pressure to feed servo-mechanisms which may act to control and regulate the gear.

The valves 51 and 52 (FIG. 5) determine the maximum permissible pressure of the oil in the pump-motor circuit. These are held closed by calibrated springs, allowing blow-off of the oil into the sump 44, if for example the motor should be subject to excess loading or seizure.

The operation of the gear will be evident from a study of the drawings, and with reference to the following description.

As soon as the driving shaft 1 is set in rotation, the movement is transmitted to the booster pump 38, which produces pressure in the hydraulic circuit of the assembly to the valves 34 and 35, drawing oil from the sump 44.

After a few turns, the oil completely fills the closed cylindrical chambers of the pistons 11 in the pump 4 and of the pistons 15 in the motor 6.

The motor begins to rotate in the opposite direction with respect to the pump 4, when its eccentricity has the same sense as that of the pump 4.

With the rotation in the direction indicated by the arrow 53 in FIG. 2, the pistons 11, in the upper semi-circle, move outwardly, either by centrifugal force, or by the action of the oil which enters the respective cylinders under booster pressure through the chamber 26 communicating with the conduit 28. The pistons 11, in the lower semi-circle, move inwardly and force the oil contained in the respective cylinders into the chamber 27 communicating with the conduits 29, causing it to pass to the motor, where exactly the converse occurs.

Variation of the eccentricity of the pump shell 12 causes variation of the oil output, consequently bringing about a variation of the rate of revolution of the motor.

More precisely, an increase of the eccentricity of the shell 12 brings about an increase in the flow of oil and consequently an increase in the number of revolutions of the motor, while on the other hand, a decrease of the eccentricity of the pump brings about a corresponding decrease of the revolutions.

When the eccentricity of the pump is zero, the motor stops, while, when the eccentricity of the pump reverses, the direction of rotation of the driven shaft reverses.

Under these conditions the pistons 11, in the lower semi-circle, are moved outwardly by oil coming from the chamber 27 and from the conduits 29, while the pistons 11 of the upper semicircle force the oil into the chamber 26 and into the conduits 28.

In an alternative embodiment of the invention, the eccentricity of the shell 16 of the motor is also variable, it being then possible to obtain a considerable increase in the number of revolutions of the driven shaft relative to the driving shaft, whether in the same direction or in the opposite direction.

The apparatus operates substantially at constant power, omitting of course losses by friction or by blow-off of the oil, within the limits determined by the dimensions of the machine and as far as permitted by the pressure limits imposed by the setting of the valves 51 and 52.

What I claim is:

1. A hydraulic variable ratio gear device, comprising, in combination, a casing, a pump having a driving shaft rotatably mounted in said casing and a rotor, means connecting said rotor with said driving shaft, said rotor having radially extending cavities, pistons slidably mounted in said cavities, a motor having a driven shaft rotatably mounted in said casing and a rotor, means connecting the second-mentioned rotor with said driven shaft, said driven shaft being coaxial with said driving shaft, the second-mentioned rotor having radially extending cavities, other pistons slidably mounted in the second-mentioned cavities, a central shaft fixedly mounted in said casing and coaxial with said driving and driven shaft, a rotary ring enclosing the first-mentioned rotor and adapted to be engaged by the first-mentioned pistons, another rotary ring enclosing the second-mentioned rotor and adapted to be engaged by said other pistons, means varying the position of at least one of said rotary rings to set it eccentrically relatively to said central shaft, a bush rotatably mounted upon said central shaft and firmly connected with the first-mentioned rotor, said bush and said central shaft having passages interconnecting the cavities of the two rotors, a booster pump having a rotor keyed upon said bush, the third-mentioned rotor having radially extending cavities, blades slidably mounted in the third-mentioned cavities, the third-mentioned rotor further having a plurality of chambers, valves connecting said passages with one of said chambers, said casing having a sump adapted to contain oil and inflow and outflow conduits connected with other chambers of the third-mentioned rotor.

2. A device in accordance with claim 1, wherein said valves are non-return ball valves carried by said central shaft, said device further comprising a safety valve in said outflow conduit.

3. A device in accordance with claim 2, wherein said safety valve is a blow-off valve, said device further comprising a calibrated spring closing said blow-off valve.

4. A device in accordance with claim 1, wherein the first-mentioned means comprise a cushioned dog clutch connecting the first-mentioned rotor with said driving shaft, and wherein the second-mentioned means comprise another cushioned dog clutch connecting the second-mentioned rotor with said driven shaft.

5. A device in accordance with claim 1, wherein the third-mentioned means comprise a circular bearing enclosing the first-mentioned rotary ring, a circular bearing enclosing the second-mentioned rotary ring, and means moving at least one of said circular bearings in a direction perpendicular to the central axis of said central shaft to set said one circular bearing and the rotary ring which it encloses eccentrically relatively to the central axis of said central shaft.

6. A device in accordance with claim 1, wherein one of the outflow conduits of said casing extends out of said casing for external connection.

References Cited

UNITED STATES PATENTS

| 2,939,403 | 6/1960 | Von Soden | 103—161 |
|---|---|---|---|
| 3,023,593 | 3/1962 | Nallinger. | |
| 3,165,069 | 1/1965 | Adamek. | |
| 3,404,584 | 10/1968 | Trautmann. | |
| 3,406,536 | 10/1968 | Domer | 64—27 |

EDGAR W. GEOGHEGAN, Primary Examiner

U.S. Cl. X.R.

64—27; 103—161